United States Patent
Fujimoto

Patent Number: 5,473,348
Date of Patent: Dec. 5, 1995

[54] APPARATUS AND METHOD OF CONTROLLING PAGING UNIT OF COPROCESSOR BUILT IN DISPLAY CONTROL SYSTEM

[75] Inventor: Akihisa Fujimoto, Tokyo, Japan

[73] Assignee: Kabushiki Kaisha Toshiba, Kawasaki, Japan

[21] Appl. No.: 73,145

[22] Filed: Jun. 8, 1993

[30] Foreign Application Priority Data

Jun. 9, 1992 [JP] Japan ..................... 4-149687

[51] Int. Cl.⁶ .................................... G09G 1/02
[52] U.S. Cl. .......................... 345/200; 345/190
[58] Field of Search .................. 345/185, 189, 345/190, 200, 203; 395/400

[56] References Cited

U.S. PATENT DOCUMENTS 4,972,338  11/1990  Crawford et al. .
5,113,180   5/1992  Gupta et al. ................ 345/190

OTHER PUBLICATIONS

"Video Subsystem", XGA Function, IBM Corporation 1989, 1991.

Primary Examiner—Richard Hjerpe
Assistant Examiner—Regina Liang
Attorney, Agent, or Firm—Finnegan, Henderson, Farabow, Garrett & Dunner

[57] ABSTRACT

A comparison result of a comparator in a paging unit determines whether the access target of a coprocessor is a system memory or a VRAM. If the target is a VRAM, predetermined bottom bits of both a TLB tag portion and a linear address to be compared are masked. If the target is the VRAM, the page frame size of paging is set to be larger than the page frame size when the access target is the system memory. Therefore, the TLB hit ratio can be improved when the access target is the VRAM, thus requiring less processing to update the TLB. This improves the drawing performance of the coprocessor.

15 Claims, 10 Drawing Sheets

ENTRY FORMAT (1 ENTRY = 32BIT)
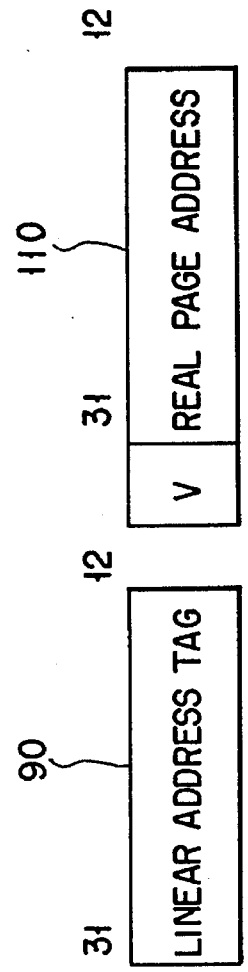
V : VALID FLAG BIT
TRANSLATE LOOK-ASIDE BUFFER
F I G. 4

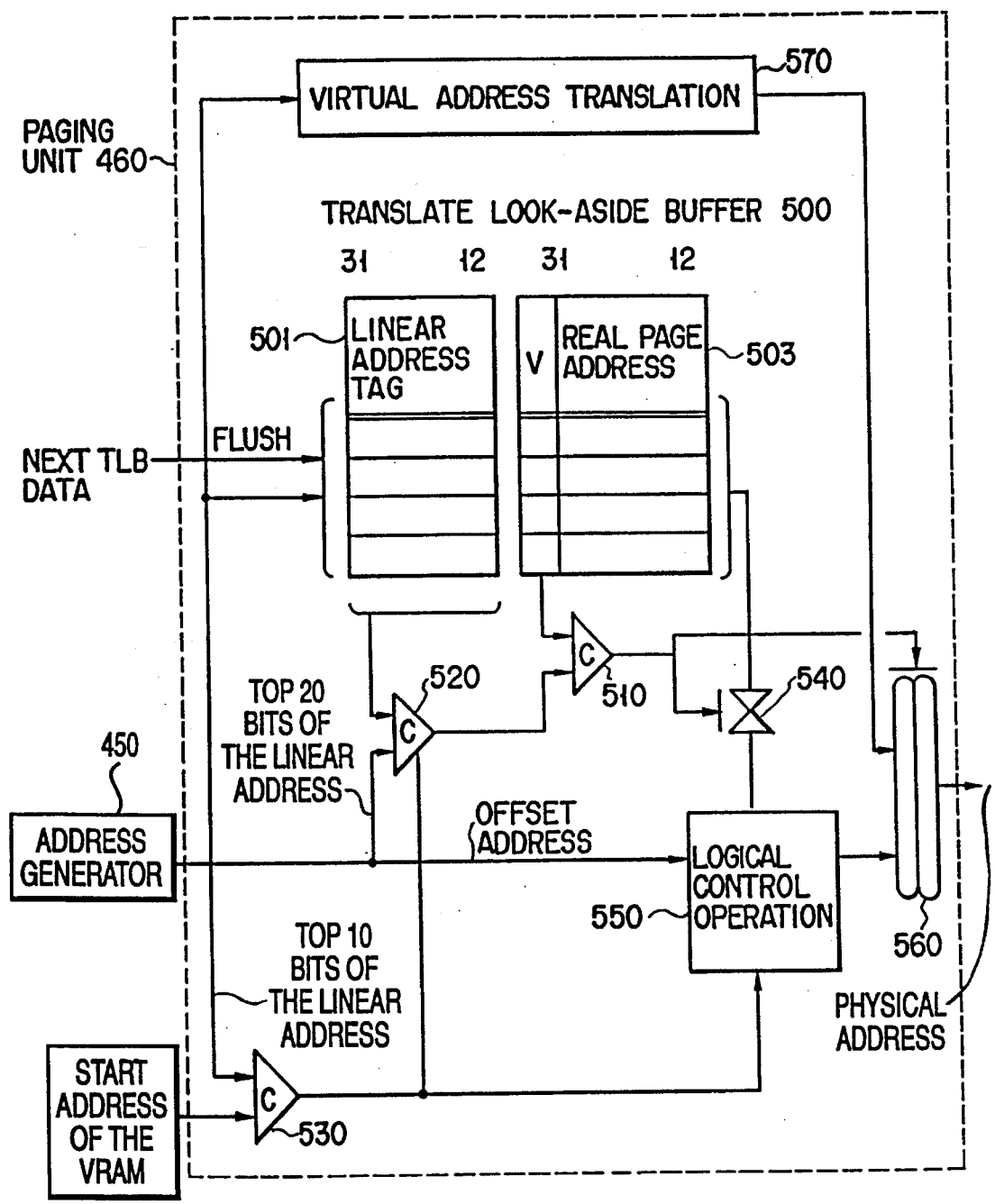
F I G. 6

| COMPARATOR 530 | REAL PAGE ADDRESS | LINEAR ADDRESS |
|---|---|---|
| NORMAL MODE (0) | TOP 20 BITS OF REAL PAGE ADDRESS | OFFSET ADDRESS (12 BITS) |
| EXTENDED MODE (1) | TOP 10 BITS OF REAL PAGE ADDRESS | BOTTOM 22 BITS OF LINEAR ADDRESS |

FIG. 7

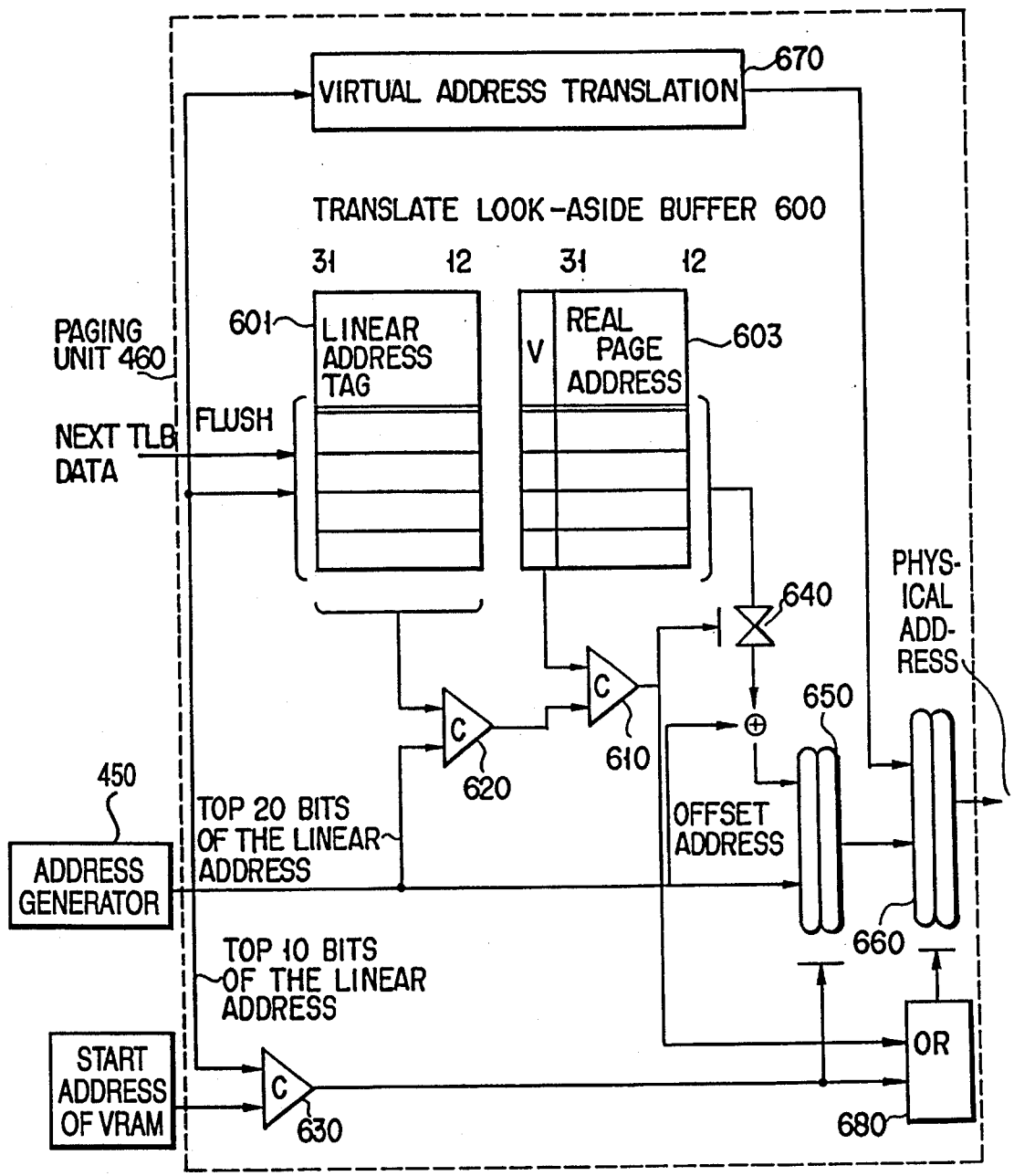
F I G. 9

APPARATUS AND METHOD OF CONTROLLING PAGING UNIT OF COPROCESSOR BUILT IN DISPLAY CONTROL SYSTEM

BACKGROUND OF THE INVENTION

1. Field of the Invention

The present invention relates to a display control apparatus for a portable computer, and, more particularly, to a technique of controlling the paging function of a coprocessor.

2. Description of the Related Art

As one of memory management schemes of a CPU, a virtual memory management (paging) is disclosed in U.S. Pat. No. 4,972,338 (titled "Memory Management for Microprocessor System," filed by Intel Corporation and registered on Nov. 20, 1990).

In protect mode of the Intel 80386 CPU or above, the paging function is supported. As shown in FIG. 1, linear addresses are freely associated with physical addresses in accordance with the contents of a table called "page table 10." The "linear address" is the value of an offset + segment base address.

The use of this paging function allows for virtual address translation and memory protection block (page frame) by block. Normally, executing the paging function requires two levels of page directories and page tables. The size of a page affects the performance/efficiency of paging. If the page size is small, there would be less waste in memory translation but many page tables would be required.

In a computer system, such a paging function is provided in various controllers which are capable of directly accessing the system memory, as well as in the CPU.

For instance, the display controller called "XGA (eXtended Graphics Array)," disclosed in "Video Subsystem," issued in 1989 and 1991 by International Business Machine Corporation, uses the paging function to be able to access the VRAM or directly access the system memory as a bus master. The coprocessor is provided with the paging function to maintain compatibility with the memory environment at the time the CPU performs paging. The address translation from a linear address to a physical address by the coprocessor built in the aforementioned XGA will now be briefly explained referring to FIGS. 1 through 4.

In the paging function, generally, a page size of 4 Kbytes is allocated per page and the head address of a page is a physical address whose bottom 12 bits are 0.

FIG. 2 presents a flowchart for address translation. To use the paging function, a page directory and a page table are placed on the system memory first. The physical address of the page directory (from the 31st bit to 12th bit of the physical address) is set in a page directory base address register (PDBR) of CR (control register) 3. Then, the PG bit of CR0 is set to enable this function (S10).

With the PG bit being 1, translation from a linear address to a physical address is carried out using virtual address translation (S20 to S30).

FIG. 3(a) illustrates how to translate a linear address to a physical address.

The linear address from the coprocessor is divided into three fields that are used to look up the corresponding physical address. The fields, called Page Directory Index 20, Page Table Index 30 and Offset 40, are illustrated in the linear address fields. The location of a page directory 60 is at a fixed physical address in memory that must be on a page (4 KB) address boundary. The coprocessor has a Page Directory Base address Register (PDBR) 50 that must be loaded with the address of the page directory base.

The Page Directory Index field of the linear address is used to index into the page directory 60. The entry read from the page directory contains 20-bit page table address and some statistical information in the low order bits.

The 20-bit page table address points to the base of a page table 70 in memory. The Page Table Index field in the linear address is used to index into the page table 70. The entry read from the page table 70 contains a 20-bit page address and some statistical information in the low order bits.

The 20-bit page address points to the base of a 4 KB page frame 80 in memory. The Offset field in the linear address is used to index into the page frame 80. The entry read from the page frame 80 contains the data required by the memory access.

The entries of the page directory 60 and page table 70 are very similar. The format of an entry is shown in FIG. 3(b).

The coprocessor in the XGA has its own internal cache of translated addresses to avoid its having to perform the two-stage translation process on every coprocessor access. This cache is referred to as a Translated Look-aside Buffer (TLB).

The TLB has two entries, one entry for the source, pattern and mask PEL maps, and the other for the destination PEL map, as shown in FIG. 4. Each entry is reserved specifically for use by one of these maps. Each entry in the TLB contains the top 20 bits of a linear address tag 90, an entry valid flag bit and the top 20 bits of the physical address corresponding to that linear address. In the case of the virtual address translation from the coprocessor, first the top 20 bits of the linear address are compared against the appropriate linear address tag 90 of the TLB. If they match, the it is determined if valid flag bit 100 of the TLB is "1." If the valid flag bit 100 is "1," called a TLB hit, the real page address is used with the bottom 12 bits of the linear address, called the offset, used as the 12 bits of the physical address. If the tag does not match, a TLB mishit occurs.

In the case of the coprocessor incorporated in the aforementioned XGA, however, paging lowers the drawing performance, such as graphics drawing and block transfer (BITBLT) for the following reason. A VRAM is memory with a large capacity of 4 Mbytes. If paging of 4 Kbytes per page is performed to this memory, a TLB mishit occurs for every 4-line drawing for a screen with each single line consisting of 1024 dots and 8 bits per pixel in the case where a straight line is drawn in the vertical direction. When a TLB mishit occurs, virtual address translation should be executed referring to the page table in the system memory and data renewal (flush) of the TLB is also required. Consequently, the speed of accessing the VRAM substantially decreases.

Since the conventional coprocessor having the paging function utilizes the paging function for the system memory directly to access the VRAM, the drawing performance is considerably reduced depending on what is to be drawn in the VRAM.

In other words, according to the prior art, the drawing performance to the VRAM is reduced by the occurrence of multiple TLB mishits.

SUMMARY OF THE INVENTION

It is therefore an object of the present invention to provide a way to efficiently make proper use of the paging function between the time of accessing a system memory and the time of accessing VRAM.

To achieve the foregoing and other objects and in accordance with the purpose of the present invention, as embodied and broadly described herein, the invention comprises: In an information processing system having a central processing unit (CPU), a system memory for storing data and instructions to be processed by the CPU, a video memory for storing image data, display controller means for displaying the image data stored in the video memory on a display, means for communicating data between the CPU, the system memory and the display controller means, the display controller means comprises: means for generating a linear address; buffer means for storing at least two pairs of linear address tags have N bits length and read page addresses having M bits length (N and M are integers); means, coupled to the address generating means, for determining whether a logical value of start linear address of the video memory is a logical value of the linear address; means for selecting one of linear address tags stored in the buffer means and determining whether a logical value of top P bits of the selected linear address tag is a logical value of top P bits of the linear address, in the case that the start linear address of the video memory is the linear address, the P is integral number and less than N; and means, coupled to the address generating means and the determining means, for generating a physical address having L bits length, from top (M−P) bits of a read page address and bottom (L−M+P) bits of linear address to access the video memory, in the base that top P bits of the selected linear address tag is top P bits of the linear address.

The display controller determines whether the access target of the coprocessor is the system memory or VRAM. If it is an access to the VRAM, the linear address tap to be compared by the address comparison means is masked by a predetermined number of bits. As a result, the page frame size becomes greater for an access to the VRAM than for an access to the system memory. It is therefore possible to improve the hit ratio of the TLB sufficiently. In an information processing system having a central processing unit (CPU), a system memory for storing data and instructions to be processed by the CPU, a video memory for storing image data, display controller means for displaying the image data stored in the video memory on a display, means for communicating data between the CPU, the system memory and the display controller means, the display controller means comprises: means for generating at least two pairs of linear address tags having N bits length and real page addresses having M bits length (N and M are integers); means, coupled to the address generating means, for determining whether a logical value of start linear of the video memory is a logical value of the linear address; and means for passing a physical address as the linear address to access the video memory, in the case that the start linear address of the video memory is the linear address.

Apparatus for displaying the image data on a display, the apparatus comprising: a system memory for storing data and instructions; a system microprocessor for processing data in accordance with the instructions; a video memory for storing an image data; display controller means for displaying the image data stored in the video memory on a display; means for communicating data between the system microprocessor, the system memory and the display controller means; coprocessor means for addressing either real or virtual memory, wherein the coprocessor means including: means for generating a linear address, means for passing a physical address as the linear address to the system memory or the video memory when addressing the real memory and passing a physical address the translated address to the system microprocessor or the video memory after translating the linear address through a virtual address translation circuit when addressing virtual memory, the virtual address translation circuit having means for translating the linear address from the coprocessor means to a physical address a page directory and page table, and buffer means for storing at least four pair of linear address tags and real page addresses corresponding to source, pattern, mask and destination entry.

And also the invention comprises:

In the display controller, the address selecting means selects the linear address generated from the address generating means in the case of accessing the VRAM. In the case of system memory access, the address selecting means selects the address output from the paging control means. Accordingly, the paging function is executed only for system memory access and is disabled for VRAM access.

Since no process to update the TLB is involved in accessing the VRAM, the drawing performance of the coprocessor can be improved sufficiently.

BRIEF DESCRIPTION OF THE DRAWINGS

Other objects and features of the invention will become apparent to those skilled in the art as the disclosure is made in the following description of presently preferred embodiments of the invention, as illustrated in the accompanying sheets of drawing in which:

FIG. 4 is a schematic diagram of a Translate Look-aside Buffer (TLB) of a coprocessor.

FIG. 6 is a block diagram showing the structure of a paging unit in a coprocessor according to the first embodiment of this invention.

FIG. 7 is a status diagram showing the logical operations of a logic controller shown in FIG. 6.

FIG. 9 is a block diagram showing the structure of a paging unit in a coprocessor according to a second embodiment of this invention.

DETAILED DESCRIPTION OF THE PREFERRED EMBODIMENTS

Preferred embodiments of the present invention will now be described referring to FIGS. 5 through 10.

Figure 1:
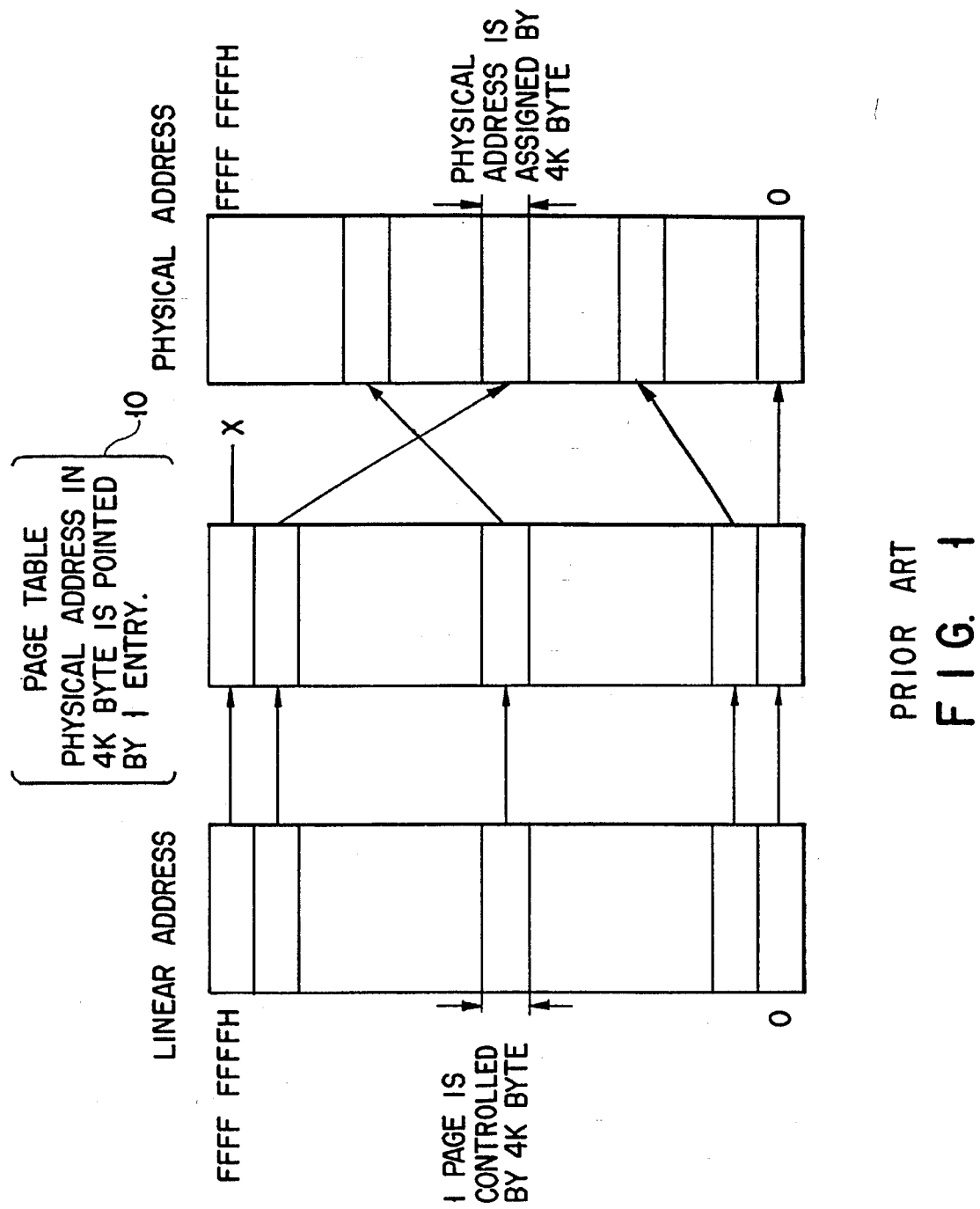
FIG. 1 is a diagram illustrating a conventional paging function from a linear address to a physical address through a page table.
Figure 2:
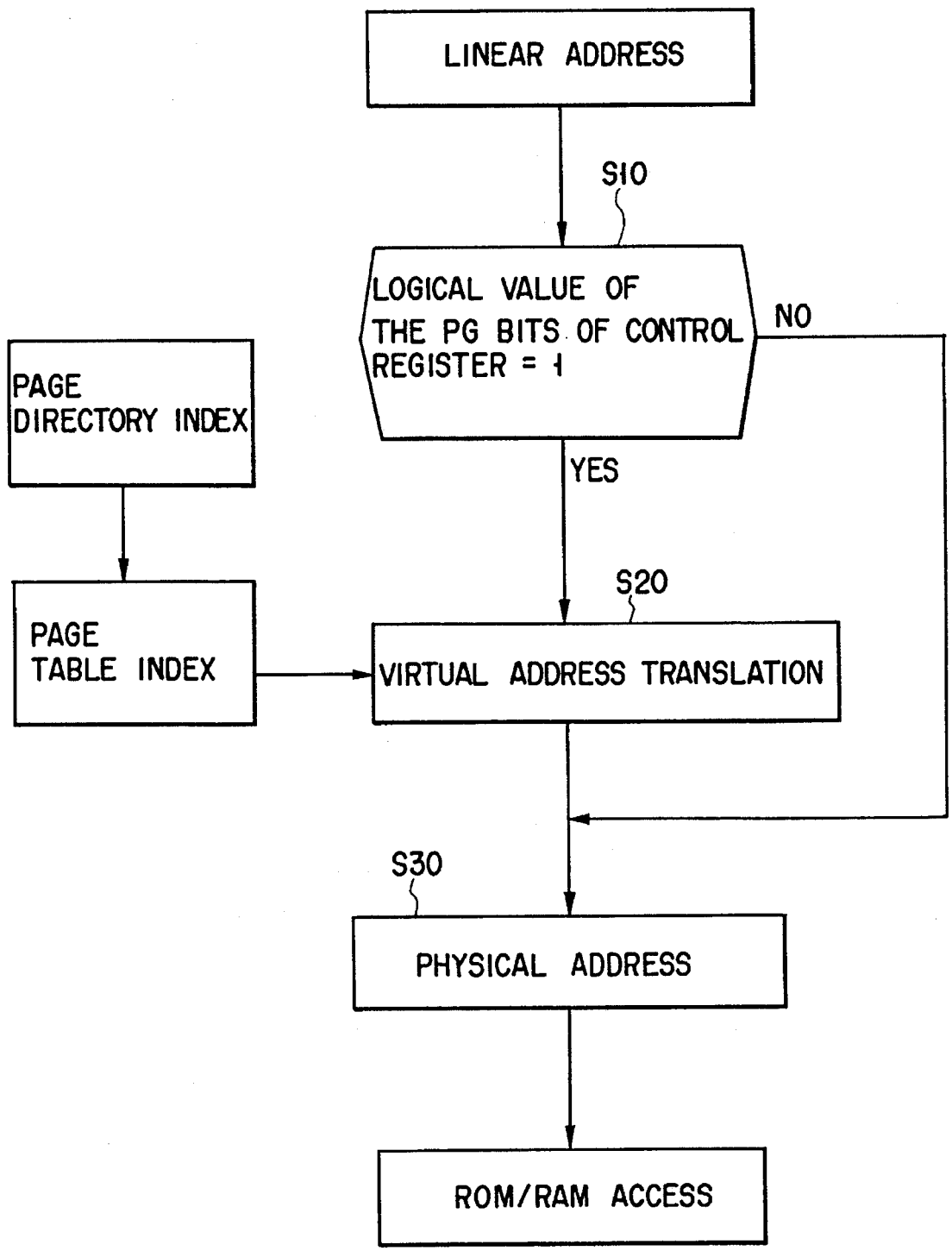
FIG. 2 is a diagram illustrating a flowchart of conventional address translation from a linear address to its corresponding physical address.
Figure 3A:
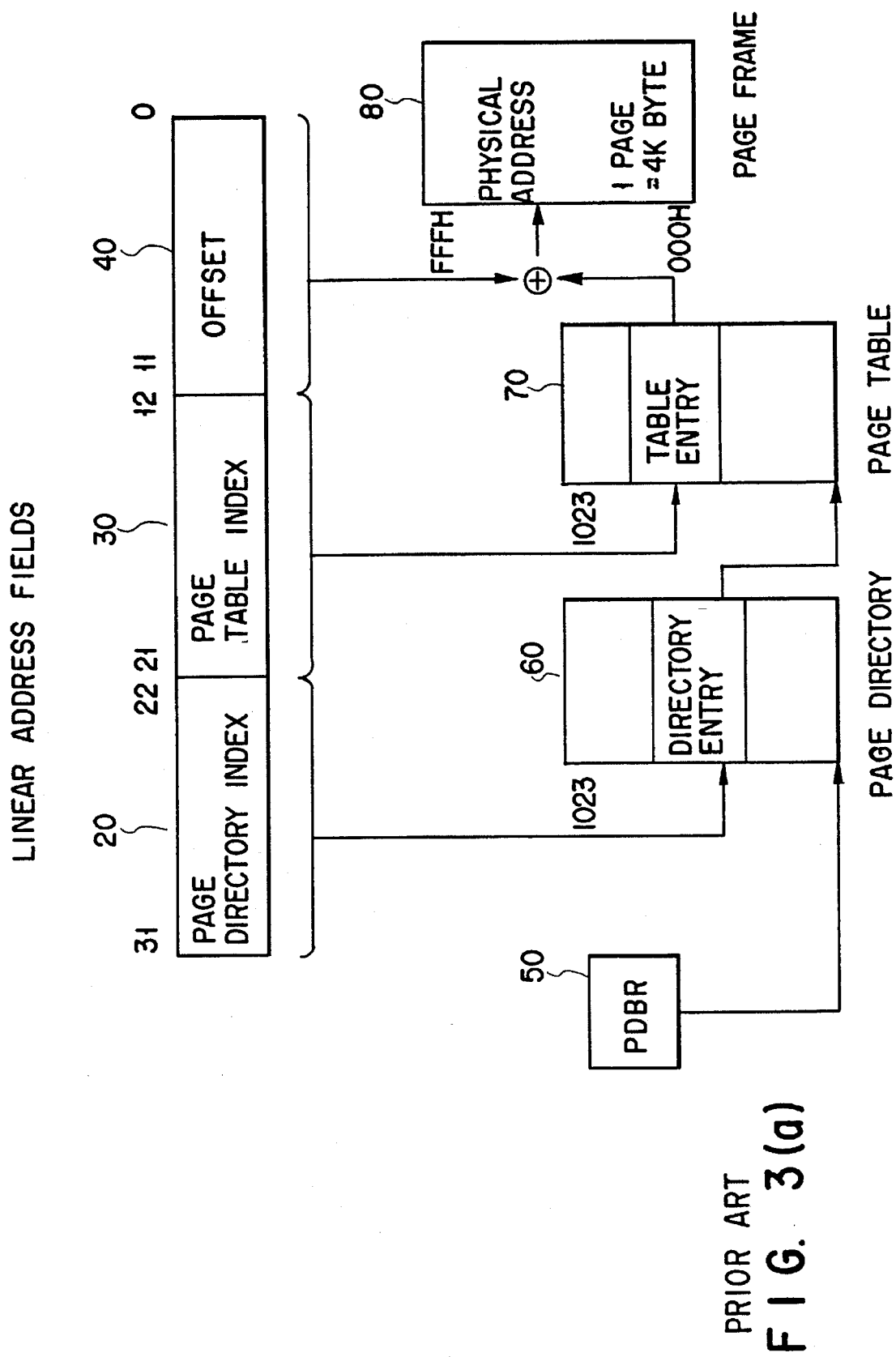
FIG. 3(a) illustrates address translation from a linear address to its corresponding physical address.
Figure 3B:
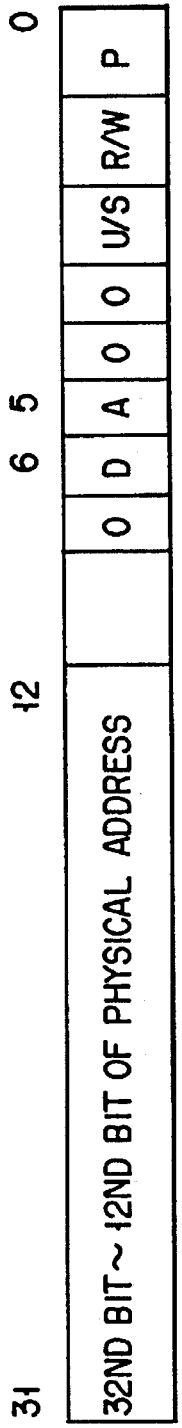
FIG. 3(b) shows a page directory and an entry format in a page table.
Figure 5:
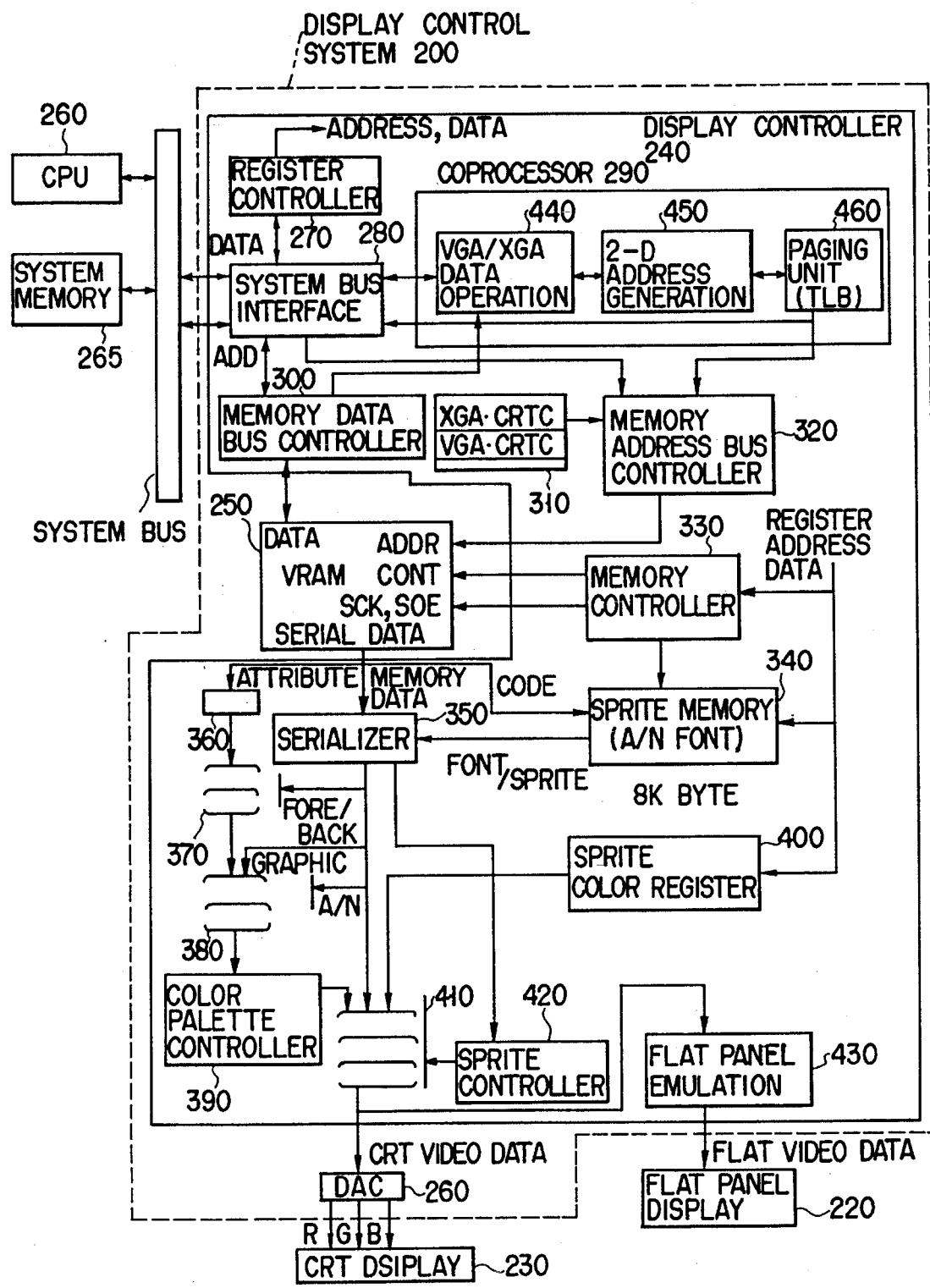
FIG. 5 is a block diagram showing the structure of a display control system according to one embodiment of this invention.

FIG. 5 illustrates the general structure of a display control system according to one embodiment of this invention. A display control system 200 has an XGA compatible specification having a display mode of 1024×768 dots in 256 colors at a time, and it is connected to a system bus 210 of a computer. This display control system 200 performs display control for both a flat panel display 220, which comes equipped with the computer body and a color CRT display 230, which is optional.

The display control system 200 is provided with a display controller 240, a dual-port VRAM 250 and a DAC (Digital/Analog Converter) 260. Those display controller 250, VRAM 250 and DAC 260 are mounted on a circuit board (not shown).

The display controller 240 is a one-chip LSI having a Gate Array architecture, and constitutes the main portion of the display control system 200. The display controller 240 performs display control of the flat panel display 220 and color CRT display 230 using the VRAm 250 and DAC 260 in accordance with an instruction from a central processing unit (CPU) 260. This display controller 240 also serves as a bus master to be able to directly access a system memory 270.

The VRAM 250 is a TOSHIBA 1-Mbyte TC528267FT/TC524165FT with a serial port (serial DATA) used for serial access and a parallel port (parallel DATA) used for random access. The serial port is used to read data to refresh the display screen, while the parallel port is used to renew display data. The VRAM 250 comprises four dual-port DRAMs and has a memory capacity of 4 Mbytes. Display data to be displayed on the flat panel display 220 or color CRT display 230 is stored in the VRAM 250.

In this case, image data with the XGA specification, which has been prepared by some application program or the like, is stored in the VRAM 250 in a packedpixel system. This packedpixel system is a color information mapping system that expresses one pixel with consecutive bits on the memory; for example, one pixel is expressed by color information of 1 bit, 2 bits, 4 bits, 8 bits or 16 bits. Image data with the video Graphic Array (VGA) specification, which has been prepared by some application program or the like, is stored in the VRAM 250 in a memory plane system. This memory plane system divides the memory area into a plurality of planes that are specified by the same address and assigns color information of each pixel to those planes. With four planes, for example, one pixel is expressed by data of a total of four bits, one bit for each plane.

The VRAM 250 also stores text data. Text data for one character consists of an 8-bit code and an 8-bit attribute and thus has a size of two bytes. The attribute information consists of 4-bit data that specifies the foreground color and 4-bit data that specifies the background color.

The DAC 260 converts CRT digital video data, produced by the display controller 240, into analog R, G and B signals and supplies the signals to the CRT display 230.

The display controller 240 comprises a register controller 270, a system bus interface 28i0, a coprocessor 290, a memory data bus controller 300, a CRT controller (CRTC) 310, a memory address bus controller 320, a memory controller 330, a sprite memory 340, a serializer 350, a latch circuit 360, a foreground/background multiplexer 370, a graphics/text multiplexer 380, a color palette controller 390, a sprite color register 400, a CRT video multiplexer 410, a sprite controller 420 and a flat panel emulation circuit 430.

The register controller 270 receives an address and data from the system bus 210 via the system bus interface 280, decodes the address and performs read//write control on various registers specified by the decoding result.

The system bus interface 280 controls interface with the host system via the system bus 210, and supports the bus interface that conforms to various specifications, such as Industrial Standard Architecture (ISA), Extended Industrial Standard Architecture (EISA), Microchannel, and Local Bus.

In response to an instruction from the CPU 260, the coprocessor 290 provides multifarious drawing functions to image data stored in the VRAM 250, which include block transfer of pixels, line drawing, filling of an area, logic and arithmetic operation between pixels, cutting of a screen, map masking, addressing with X-Y coordinates and paging-oriented memory management. The coprocessor 290 is provided with a VGA/XGA data operation circuit 440, a two-dimensional address generator 450 and a paging unit 460.

The data operation circuit 440 performs data operations, such as shift, logic and arithmetic operations, bit mask and color comparison, and has a bit block transfer (BITBLT) compatible with VGA. The two-dimensional address generator 450 generates two-dimensional X-Y addresses to access rectangular regions, for example. The two-dimensional address generator 450 also performs regional checking and translation to a linear address using segmentation or the like. The paging unit 460 supports the same virtual address translation that the CPU 260 does. When paging is enabled, the paging unit 460 translates the linear address generated by the two-dimensional address generator 131 into a physical address. With paging disabled, the linear address directly becomes a physical address. This paging unit 460 has a translate look-aside buffer (TLB) for paging.

The paging unit 460 is so designed as to carry out different pagings for access to the system memory 270 and access to the VRAM 250 both done by the coprocessor 290. This selective paging is the feature of the present invention, which will be described in detail later with reference to FIGS. 6 through 10.

The memory data bus controller 300 controls the data bus of the parallel data port of the VRAM 250, and has a buffer that continuously accesses data of four maps, namely, source, pattern, mask and destination, in page mode. This buffer also serves as a write data buffer.

The CRT controller 310 includes a CRT controller (CRTC) for XGA, which generates various types of display timing signals (horizontal sync signal, vertical sync signal, etc.) to display a screen on the flat panel display 220 or CRT display 230 with a resolution of 1024×768 dots that conforms to the XGA specification, and a CRTC for VGA, which generates various types of display timing signals to display a screen on the flat panel display 220 or CRT display 230 with a resolution of 640×460 dots that conforms to the VGA specification. The CRT controller 310 also generates a display address for reading out image data to be displayed, from the serial port of the VRAM 250.

The memory address bus controller 320 selects an address from the CPU 260, an address from the coprocessor 290 or an address from the CRT controller 310, all supplied through the system bus interface 280, and sends the selected address to the VRAM 250. The memory controller 330 generates various types of control signals (CONT) for read/write access to the VRAM 250, a serial clock (SCK) to control the timing of reading data from the serial port and an output enable signal (SOE). The memory controller 330 also controls access to the sprite memory 340 and control the timing for sprite display.

Sprite data is written in the sprite memory 340 in graphics mode and font data is written there in text mode. In text mode a font code for text data read from the VRAM 250 is supplied as an index to the sprite memory 340. Then, font data corresponding to that font code is read from the sprite memory 340. The serializer 350 is a parallel/serial converter which converts parallel data for a plurality of pixels to pixel-by-pixel serial data. The serializer 350 performs parallel/serial conversion of both the data read from the VRAM 250 and the sprite data read from the sprite memory 340 in graphics mode, and performs parallel/serial conversion of the font data read from the sprite memory 340 in text mode.

The latch circuit 360 delays the output timing for the attribute by a delay originating from the conversion of the font code to the font data. This latch circuit 360 holds the attribute of the text data from the VRAM 250 in text mode. The foreground/background multiplexer 370 selects one of the foreground color and background color of the attribute in text mode. This selection is controlled by the value of the font data output from the serializer 350, "1" (foreground) and "0" (background). The graphics/text multiplexer 380 switches between the graphics mode and text mode. This graphics/text multiplexer 380 selects memory data output from the serializer 350 in graphics mode and selects the output of the foreground/background multiplexer 370 in text mode.

The color palette controller 390 performs color conversion of graphics data or text data. This controller 390 has built-in color two-stage palette tables. The first color palette table consists of 16 color palette registers in each of which 6-bit color palette data is stored. The second color palette table consists of 256 color palette registers in each of which 18-bit color data, six bits for each of R, G and B, is stored.

In graphics mode, memory data of 8 bits/pixel having the XGA specification is sent directly to the second color palette table without going through the first color palette table, and is converted into color consisting of 6 bits for each of R, G and B. Memory data of 4 bits/pixel having the VGA specification is sent first to the first color palette table by which it is converted into 6-bit color data. 2-bit data output from a built-in color select register is added to this 6-bit color data, yielding 8-bit color data. This 8-bit color data is then sent to the second color palette table by which it is converted into color data consisting of 6 bits for each of R, G and B.

In text mode, text data having either the XGA or VGA specification is converted into color consisting of 6 bits for each of R, G and B, through both the first and second color palette tables.

The XGA graphics mode includes a direct color mode where one pixel consists of 16 bits. In this case, memory data of 16 bits/pixel is supplied directly to the CRT video multiplexer 410 without going through the color palette controller 390.

The sprite color register 400 specifies the sprite display color. The CRT video multiplexer 410 selects the CRT video display output, either the output of the color palette controller 390 or the direct color output from the serializer 350, and further performs video switching of the sprite display. In sprite display mode, the sprite controller 420 controls the CRT video multiplexer 410 in accordance with the sprite data that has undergone parallel/serial conversion in the serializer 350. The flat panel emulation circuit 430 converts the CRT video output to produce flat video data for the flat panel display 220.

One example of the structure of 460 the paging unit 460 incorporated in the coprocessor 290 according to this invention will be described referring to FIGS. 6 and 7.

As illustrated, the paging unit 460 comprises a virtual address translation circuit 570, a TLB 500, three comparators 510, 520 and 530, a buffer circuit 540, a logic controller 550 and an address multiplexer 560.

The logic controller 550 performs logical operations described in FIG. 7, based on a control signal from the comparator 530.

The address multiplexer 560 selects the physical address produced by the logic controller 550 when there is a TLB hit. When a TLB mishit occurs, the address multiplexer 560 selects the page table address produced from the virtual address translation circuit 570.

The virtual address translation circuit 570 produces a page table address to refer to the proper page table on the system memory 270, based on the linear address generated from the address generator 450. The TLB 500, a cache for address translation, has four entries in each of which a linear address tap 501 and the top 20 bits of a physical address after page translation (real page address 503) are registered. The linear address tag 501 indicates the top 20 bits of a linear address before page translation.

Figure 8:
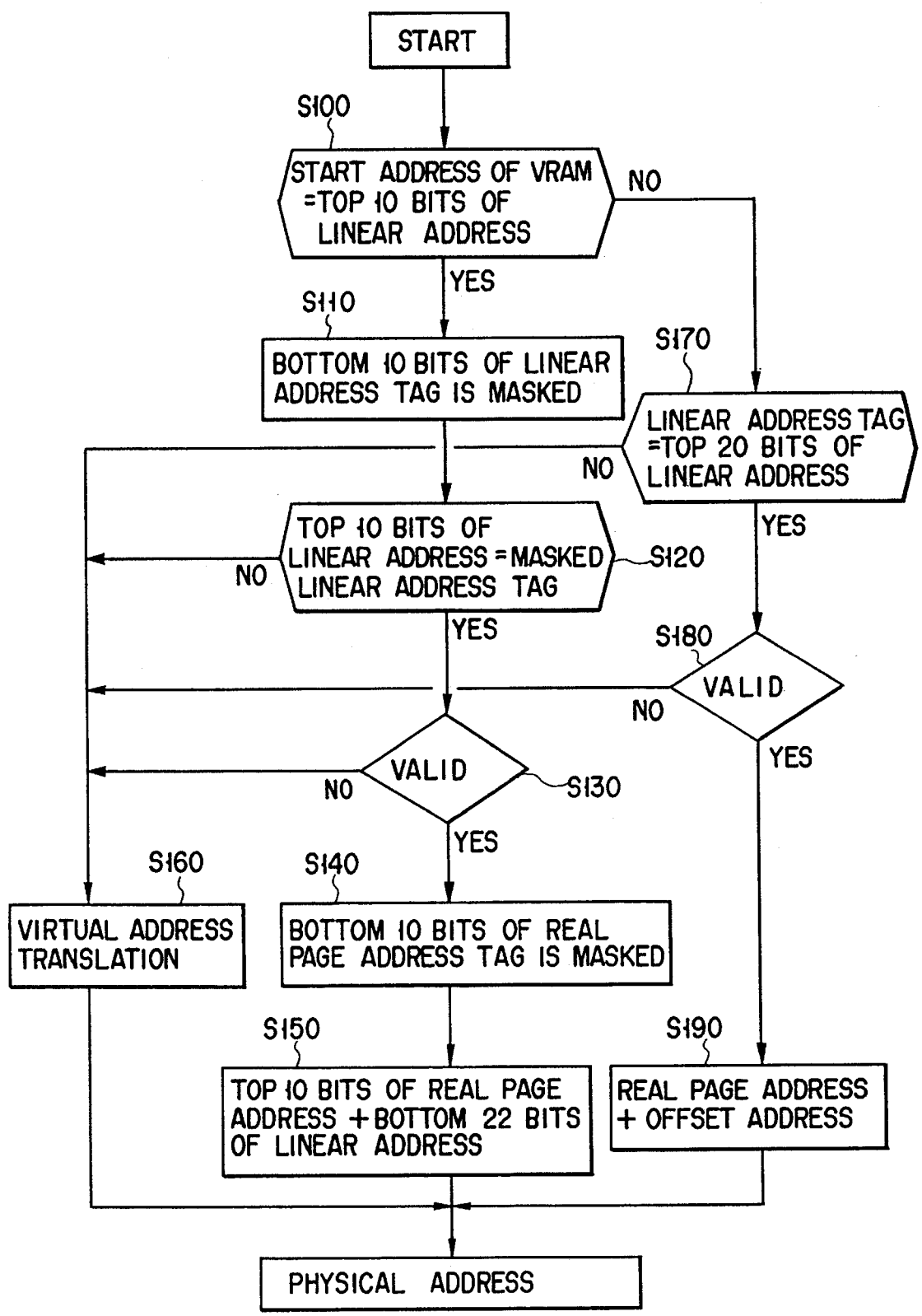
FIG. 8 presents a flowchart illustrating the operation of a paging unit shown in FIG. 6.

Referring to FIG. 8, a description will now be given of the operation of the present invention in the case where the coprocessor 290 draws a straight line on the VRAM 250.

The address generator 450 produces linear addresses which indicate points to plot a straight line. When the paging unit 460 performs paging, each linear address is separated into a 20-bit linear address, the top 20 bits, and an offset address, the bottom 12 bits. One of the four entries is selected referring to the TLB 500 based on the 20-bit linear address. The linear address tag 501 for the selected entry is read out. The 32-bit linear address is also sent to the virtual address translation circuit 570. This circuit 570 produces a page table address for accessing a page table on the system memory 270.

The comparator 530 performs address comparison to check if the top 10 bits of the linear address generated from the address generator 450 is within the range of a preassigned address in the VRAM 250. If the comparison of the comparator 530 has resulted in a match, mask signals to mask the bottom 10 bits of the 20-bit linear address, the 9th bit to 0th bit, which are used for comparison of those bottom 10 bits, are output to the comparator 520 and the logic controller 550 (S100 and S110).

The comparator 520 comprises at least 20 comparators. The comparator 520 compares the top 20 bits of the linear address generated from the address generator 450 with the proper linear address tag 501 of the TLB 500 (S120 or S170).

In this case, the number of bits of the address to be compared is altered by a control signal from the comparator 530. If the comparison result of the comparator 530 is a mismatch, the comparator 520 performs the ordinary 20-bit comparison (S170).

If the comparison result of the comparator 520 is a match, the comparator 510 then performs comparison of the valid flag bit corresponding to the compared linear address tag 501 (S130).

If the comparison result of the comparator 520 is a mismatch (S120 or S170), which implies the occurrence of a TLB mishit, ordinary address translation using the virtual address translation circuit 570 is executed (S160). This circuit 570 refers to the proper page table based on the page table address. New TLB data read from that page table is registered in the TLB 500.

If the comparison result of the comparator 510 is a match, the comparator 510 enables the buffer circuit 540 to output the 20-bit real page address 503 corresponding to the compared linear address tag 501 to the logic controller 550. If the comparison result of the comparator 530 is a mismatch, the logic controller 550 specifies a physical address from the bottom 12 bits of the linear address generated from the address generator 450 (called offset) and the top 20 bits of the real page address 503 of the TLB 500, based on the logic levels described in FIG. 7 (S190). If the comparison result of the comparator 530 is a match, the bottom 10 bits of the real page address 503 are masked (S140). Then, the logic controller 550 specifies a physical address from the bottom 22 bits of the linear address generated from the address generator 450 and the masked real page address 503 (S140 and S150).

The address multiplexer 560 selects one of the page table address generated by the virtual address translation circuit 570 and the physical address translated by the logic controller 550. The selecting action of the address multiplexer 560 is controlled by a signal from the comparator 510, which represents a match or mismatch. When the comparison result of the comparator 510 is a match, the address multiplexer 560 selects the physical address translated by the logic controller 550. When the comparison result of the comparator 510 is a mismatch, on the other hand, the address multiplexer 560 selects the page table address output from the virtual address translation 570.

With the above-described structure of the present invention, although the page size at the time the system memory 270 is accessed is normally 4 KB, the page size at the time the VRAM 250 is accessed becomes 4 MB by masking the bottom 10 bits of both the linear address tag 501 and real page address 503, thus increasing the TLB hit ratio.

Another example of the structure of the paging unit 460 incorporated in the coprocessor 290 will be described below referring to FIGS. 9 and 10.

As illustrated, the paging unit 460 comprises a virtual address translation circuit 670, a TLB 600, three comparators 610, 620 and 630, a buffer circuit 640, address multiplexers 650 and 660, and an OR gate 680.

The address multiplexer 650 selects one of a 32-bit linear address generated from the address generator 450 and an address after page translation, read from the TLB 600. More specifically, the address multiplexer 690 selects the address after page translation, read from the TLB 600, to access the system memory 270, and selects the linear address from the address generator 450 to access the VRAM 250.

The address multiplexer 660 selects one of a page table address output from the virtual address translation circuit 670 and the output of the address multiplexer 650. The selecting action of the address multiplexer 660 is controlled by the output of the OR gate 680. More specifically, the address multiplexer 660 selects the output of the address multiplexer 650 when the output of the OR gate 680 is "1" (in the case of access to the VRAM 250 based on the comparison result of the comparator 630 or a TLB hit based on the comparison results of comparators 610 and 620). When the output of the OR gate 680 is "0" (in the case of both access to the system memory 270 based on the comparison result of the comparator 630 and a TLB mishit based on the comparison results of comparators 610 and 620), the address multiplexer 660 selects the page table address from the virtual address translation circuit 670.

The virtual address translation circuit 670 produces a page table address to refer to the proper page table on the system memory 270, based on the linear address generated from the address generator 450. The TLB 600, a cache for address translation, has four entries in each of which a linear address tap 601 and the top 20 bits of a physical address after page translation are registered. The linear address tag 601 indicates the top 20 bits of a linear address before page translation.

Figure 10:
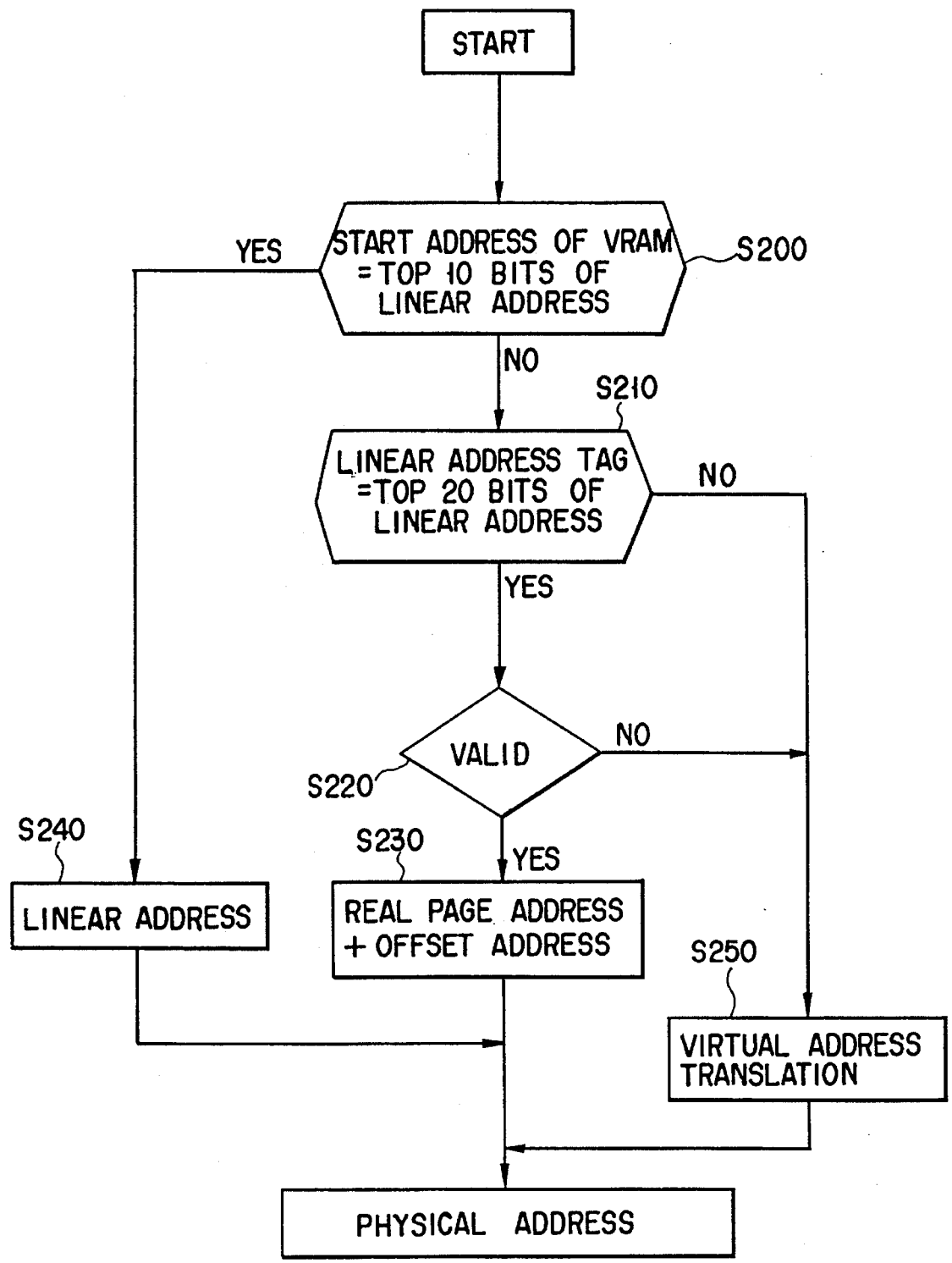
FIG. 10 presents a flowchart illustrating the operation of the paging unit shown in FIG. 9.

Referring to FIG. 10, a description will now be given of the operation of the present invention in the case where the coprocessor 290 draws a straight line on the VRAM 250.

The address generator 450 produces linear addresses which indicate points to plot a straight line. When the paging unit 460 performs paging, each linear address is separated into a 20-bit linear address, the top 20 bits, and an offset address, the bottom 12 bits. One of the four entries is selected referring to the TLB 600 based on the 20-bit linear address. The linear address tag 601 for the selected entry is read out.

The 32-bit linear address is also sent to the virtual address translation circuit 670. This circuit 670 produces a page table address for accessing a page table on the system memory 270.

The comparator 630 performs address comparison to check if the top 10 bits of the linear address generated from the address generator 450 is within the range of a preassigned address in the VRAM 250. The comparator 630 outputs the comparison result to the address multiplexer 650 and the OR gate 680. If the comparison of the comparator 630 has resulted in a mismatch (No in S200), the comparator 630 sends out a control signal to the address multiplexer 650 to select the physical address from the TLB 600.

The comparator 620 compares the top 20 bits of the linear address generated from the address generator 450 with the linear address tag 601 of the TLB 600 (S210). If the comparison result of the comparator 620 is a match (Yes in S210), the comparator 610 then performs comparison of the valid flag bit corresponding to the compared linear address tag 601 (S220).

If the comparison result of the comparator 620 is a mismatch (No in S210), since the output of the OR gate is "0" in the case of a TLB mishit, the address multiplexer 660 selects the page table address, output from the virtual address translation circuit 670 (S250). This circuit 670 refers to the proper page table on the system memory 270 based on the page table address. New TLB data read from that page table is registered in the TLB 600.

If the comparison result of the comparator 610 is a match (Yes in S220), the comparator 610 enables the buffer circuit 640 to output the real page address 603 of the TLB 600 corresponding to the selected linear address tag 601 to the address multiplexer 650. Since the output of the OR gate 680 is "1," the address multiplexer 660 selects the output of the address multiplexer 650, i.e., the address output of the TLB 600. As this address is the real page address 603, an offset address of the linear address is added to it (S230). In other words, when the comparison results of the comparators 610 and 620 indicate the occurrence of a TLB hit, the linear address is translated to the corresponding physical address.

If the comparison result of the comparator 630 indicates access to the VRAM 250 (Yes in S200), the address multiplexer 650 selects the 32-bit linear address from the address generator 450. And the address multiplexer 660 selects the output of the address multiplexer 650 regardless of a TLB hit or TLB mishit (S240).

With the structure of the second embodiment of this invention, when the VRAM 250 is to be accessed, address translation using the TLB 600 and outputting of the page table address to update the TLB 600 are both inhibited, and paging is automatically made invalid. That is, when the VRAM 250 is to be accessed, there is no process to update the TLB 600 so that the drawing performance of the coprocessor 290 can improved sufficiently.

In FIG. 9, the address multiplexer 660 is controlled by the output of the OR gate 680. Since it is essential to disable paging in the case of access to the VRAM 250 in the second embodiment, the address multiplexer 660 may be controlled directly by the output of the comparator 630 without involving the OR gate 680.

What is claimed is:

1. In an information processing system having a central processing unit (CPU), a system memory for storing data and instructions to be processed by the CPU, a video memory for storing an image data, display controller means for displaying the image data stored by the video memory on a display, means for communicating data between the CPU, the system memory and the display controller means, the display controller means comprises:

means for generating a linear address;

buffer means for storing at least two pairs of linear address tags having N bits length and real page addresses having M bits length, the N and M are integral numbers;

means, coupled to the address generating means, for determining whether a logical value of start linear address of the video memory is a logical value of the linear address;

means for selecting one of the linear address tags stored in the buffer means and determining whether a logical value of top P bits of the selected linear address tag is a logical value of top P bits of the linear address, in the case that the start linear address of the video memory is the linear address, the P is an integral number and less than the N; and means, coupled to the address generating means and the determining means, for generating a physical address having L bits length, from top (M–P) bits of a real page address and bottom (L–M+P) bits of linear address to access the video memory, in the case that top P bits of the selected linear address tag is top P bits of the linear address.

2. The system according to claim 1, wherein the buffer means includes an entry flag bit, further comprising:

means, coupled to the address generating means and the comparing means, for determining whether an entry flag bit corresponding to the selected linear address tag is valid; and means for generating a physical address from a virtual address translation to access the video memory.

3. The system according to claim 1, further comprising:

register means for storing top 10 bits of start linear address of the video memory; and means for comparing a logical value stored in the register means with top 10 bits of the linear address.

4. The system according to claim 1, wherein the linear address includes an offset address having (L–M) bits length, further comprising:

means for selecting one of linear address tags stored in the buffer means and determining whether a logical value of the selected linear address tag is a logical value of top N bits of the linear address, in the case that the start linear address of the video memory is not the linear address; and means for generating a physical address from the real page address corresponding to the selected linear address tag and the offset address to access the video memory, in the case that the selected linear address tag is top N bits of the linear address.

5. In an information processing system having a central processing unit (CPU), a system memory for storing data and instructions to be processed by the CPU, a video memory for storing an image data, display controller means for displaying the image data stored by the video memory on a display, means for communicating data between the CPU, the system memory and the display controller means, the display controller means comprises:

means for generating a linear address;

buffer means for storing at least two pairs of linear address tags having N bits length and real page addresses having M bits length, the N and M are integral numbers;

means, coupled to the address generating means, for determining whether a logical value of start linear address of the video memory is a logical value of the linear address and means for passing a physical address as the linear address to access the video memory, in the case that the start linear address of the video memory is the linear address.

6. The system according to claim 5, wherein the linear address includes an offset address having (L–M) bits length, further comprising:

means for selecting one of linear address tags stored in the buffer means and determining whether a logical value of the selected linear address tag is a logical value of top N bits of the linear address, in the case that the start linear address of the video memory is not the linear address; and means for generating a physical address from the real page address corresponding to the selected linear address tag and the offset address to access the video memory, in the case that the selected linear address tag is top N bits of the linear address.

7. The system according to claim 5, wherein the buffer means includes an entry flag bit, further comprising:

means, coupled to the address generating means and the comparing means, for determining whether an entry flag bit corresponding to the selected linear address tag is valid; and means for generating a physical address from a virtual address translation to access the video memory.

8. The system according to claim 5, further comprising means for inhibiting virtual address translation from translating a linear address into a physical address, in the case that the start linear address of the video memory is the linear address.

9. The system according to claim 5, further comprising means for inhibiting the buffer means from outputting a real page address, in the case that the start linear address of the video memory is the linear address.

10. The system according to claim 5, wherein the linear address includes an offset address, further comprising means for selecting one of an linear address and the translated address from an real page address and an offset address.

11. Apparatus for displaying the image data on a display, the apparatus comprising:

a system memory for storing data and instructions;

a system microprocessor for processing data in accordance with the instructions;

a video memory for storing the image data;

display controller means for displaying the image data stored by the video memory on a display;

means for communicating data between the system microprocessor, the system memory and the display controller means;

coprocessor means for addressing either a real or virtual memory, wherein the coprocessor means includes:

means for generating a linear address;

means for passing a physical address as the linear address to the system memory when a logical value of a start linear address of the video memory is a logical value of the generated linear address and passing the physical address as the translated address to the video memory after translating the linear address through a virtual address translation circuit when addressing virtual memory, the virtual address translation circuit having means for translating the linear address from the coprocessor means to a physical address of a page directory and page table; and buffer means for storing at least four pairs of linear address tags and real page addresses corresponding to source, pattern, mask and destination entry.

12. The apparatus according to claim 11, further comprising means for disenabling the virtual address translation circuit.

13. The apparatus according to claim 11, further comprising:

means for selecting one of linear address tags stored in the buffer means and determining whether a logical value of the selected linear address tag is a logical value of top N bits of the linear address, in the case that the start linear address of the video memory is not the linear address, the N is an integral number; and means for passing a physical address from the real page address corresponding to the selected linear address tag and the offset address to access the video memory, in the case that the selected linear tag is top N bits of the linear address.

14. The apparatus according to claim 11, wherein the buffer means includes an entry flag bit, further comprising:

means for determining whether an entry flag bit corresponding to the selected linear address tag is valid; and means for generating a physical address from a virtual address translation circuit to access the system memory.

15. The apparatus according to claim 11, further comprising:

register means for storing top 10 bits of start linear address of the video memory; and means for comparing a logical value stored in the register means with top 10 bits of the linear address.

* * * * *